US011681907B2

United States Patent
Abdelaziz et al.

(10) Patent No.: US 11,681,907 B2
(45) Date of Patent: Jun. 20, 2023

(54) SYSTEM AND METHOD FOR PERFORMING COMPUTATIONS FOR DEEP NEURAL NETWORKS

(71) Applicant: Samsung Electronics Co., Ltd., Suwon-si (KR)

(72) Inventors: Hamzah Abdelaziz, San Jose, CA (US); Joseph Hassoun, Los Gatos, CA (US); Ali Shafiee Ardestani, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/966,488

(22) Filed: Oct. 14, 2022

(65) Prior Publication Data
US 2023/0047273 A1 Feb. 16, 2023

Related U.S. Application Data

(63) Continuation of application No. 16/900,845, filed on Jun. 12, 2020, now Pat. No. 11,507,817.
(Continued)

(51) Int. Cl.
*G06N 7/00* (2023.01)
*G06N 3/065* (2023.01)
(Continued)

(52) U.S. Cl.
CPC ........... *G06N 3/065* (2023.01); *G06F 9/3001* (2013.01); *G06F 9/30032* (2013.01);
(Continued)

(58) Field of Classification Search
CPC ...................................................... G06N 7/00
See application file for complete search history.

(56) References Cited

U.S. PATENT DOCUMENTS 5,379,440 A * 1/1995 Kelly ................ G06F 15/17337
712/12
8,924,455 B1 12/2014 Barman et al.
(Continued)

FOREIGN PATENT DOCUMENTS

EP           3 557 485 A1    10/2019
WO    WO 2018/211129 A1    11/2018
(Continued)

OTHER PUBLICATIONS

Jouppi, Norman P. et al., "In-Datacenter Performance Analysis of a Tensor Processing Unit™", Jun. 26, 2017, 17 pages, https://arxiv.org/ftp/arxiv/papers/1704/1704.04760.pdf.
(Continued)

*Primary Examiner* — Jae U Jeon
(74) *Attorney, Agent, or Firm* — Lewis Roca Rothgerber Christie LLP

(57) ABSTRACT

A computation unit for performing a computation of a neural network layer is disclosed. A number of processing element (PE) units are arranged in an array. First input values are provided in parallel in an input dimension of the array during a first processing period, and a second input values are provided in parallel in the input dimension during a second processing period. Computations are performed by the PE units based on stored weight values. An adder coupled to the first set of PE units generates a first sum of results of the computations by the first set of PE units during the first processing cycle, and generates a second sum of results of the computations during the second processing cycle. A first accumulator coupled to the first adder stores the first sum, and further shifts the first sum to a second accumulator prior to storing the second sum.

18 Claims, 15 Drawing Sheets

Related U.S. Application Data

(60) Provisional application No. 63/011,613, filed on Apr. 17, 2020.

(51) Int. Cl.
| | |
|---|---|
| *G06F 9/30* | (2018.01) |
| *G06F 9/54* | (2006.01) |
| *G06N 3/04* | (2023.01) |
| *G06N 3/08* | (2023.01) |

(52) U.S. Cl.
CPC ...... *G06F 9/30036* (2013.01); *G06F 9/30101* (2013.01); *G06F 9/545* (2013.01); *G06N 3/04* (2013.01); *G06N 3/08* (2013.01)

(56) References Cited

U.S. PATENT DOCUMENTS

| | | | |
|---|---|---|---|
| 10,445,638 | B1 | 10/2019 | Amirineni et al. |
| 10,459,876 | B2 | 10/2019 | Vantrease et al. |
| 2004/0263653 | A1* | 12/2004 | Inada ............... G06T 1/0007 348/294 |
| 2018/0032857 | A1 | 2/2018 | Lele et al. |
| 2018/0046907 | A1 | 2/2018 | Ross et al. |
| 2018/0107921 | A1 | 4/2018 | Ross et al. |
| 2018/0129936 | A1 | 5/2018 | Young et al. |
| 2018/0165577 | A1 | 6/2018 | Young et al. |
| 2018/0307980 | A1 | 10/2018 | Barik et al. |
| 2018/0336164 | A1 | 11/2018 | Phelps et al. |
| 2019/0026078 | A1 | 1/2019 | Bannon et al. |
| 2019/0041961 | A1 | 2/2019 | Desai et al. |
| 2019/0042923 | A1* | 2/2019 | Janedula ............... G06F 17/15 |
| 2019/0050717 | A1 | 2/2019 | Temam et al. |
| 2019/0065940 | A1 | 2/2019 | Ross |
| 2019/0080239 | A1 | 3/2019 | Yang |
| 2019/0102640 | A1 | 4/2019 | Balasubramanian |
| 2019/0164036 | A1 | 5/2019 | Kim et al. |
| 2019/0187963 | A1 | 6/2019 | Bokhari et al. |
| 2019/0236113 | A1 | 8/2019 | Chen et al. |
| 2019/0311243 | A1 | 10/2019 | Whatmough et al. |
| 2019/0324746 | A1 | 10/2019 | Maiyuran et al. |
| 2019/0339942 | A1 | 11/2019 | Olsen |
| 2020/0159809 | A1* | 5/2020 | Catthoor ............... G06N 3/063 |

FOREIGN PATENT DOCUMENTS

| | | |
|---|---|---|
| WO | WO 2019/057281 A1 | 3/2019 |
| WO | WO 2019/177639 A1 | 9/2019 |

OTHER PUBLICATIONS

Chen, Yu-Hsin et al., "Eyeriss: An Energy-Efficient Reconfigurable Accelerator for Deep Convolutional Neural Networks," IEEE ISSCC 2016, 10 pages, http://eyeriss.mit.edu/.

Wang, Shihao et al., "Chain-NN: An Energy-Efficient 1D Chain Architecture for Accelerating Deep Convolutional Neural Networks," https://arxiv.org/abs/1703.01457, 6 pages.

Kung, H.T., "Systolic architectures, which permit multiple computations for each memory access, can speec execution of compute-bound problems without increasing I/O requirements," http://www.eecs.harvard.edu/~htk/publication/1982-kung-why-systolic-architecture.pdf, Carnegie-Mellon University, 10 pages.

\* cited by examiner

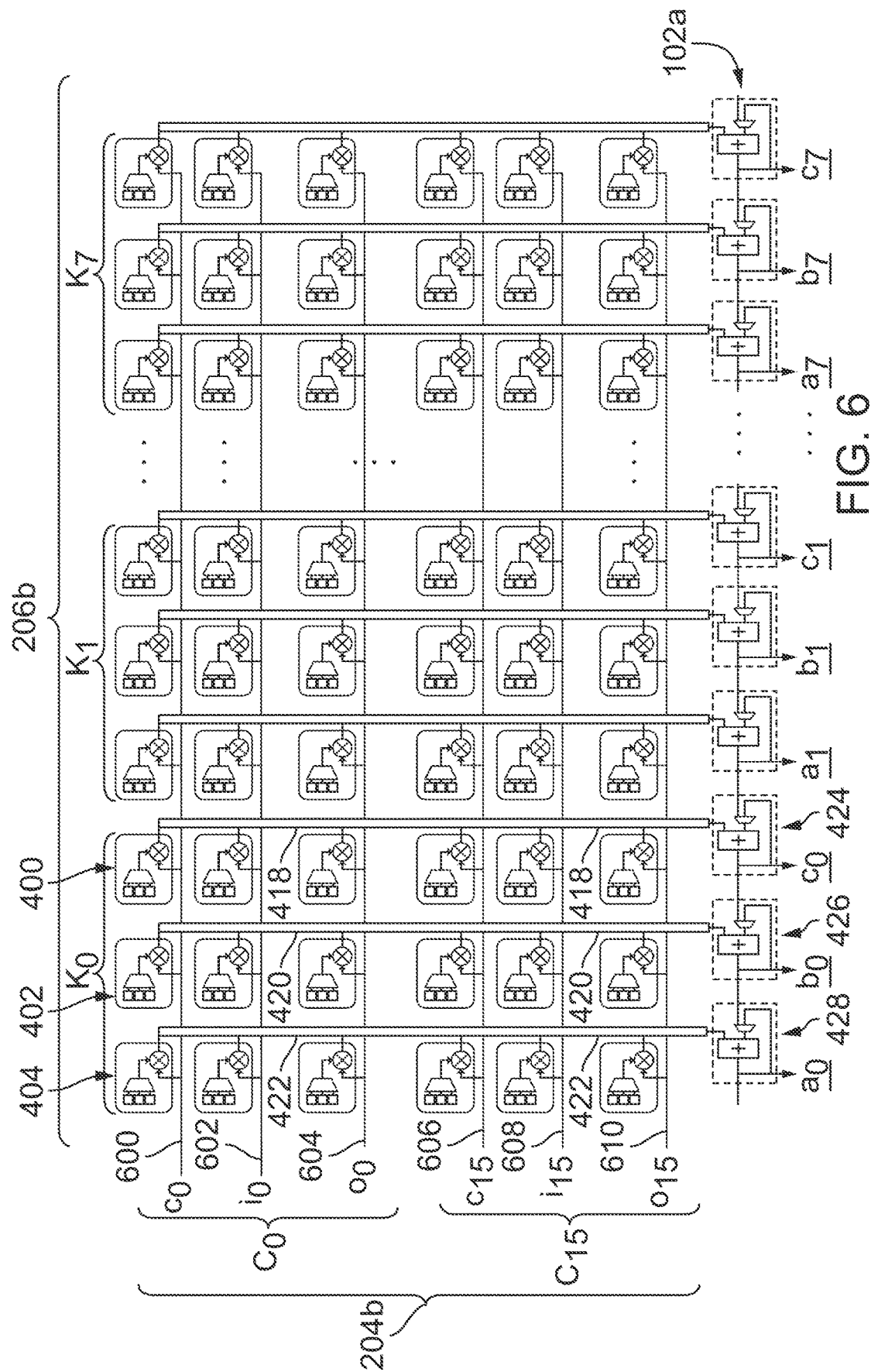

SYSTEM AND METHOD FOR PERFORMING COMPUTATIONS FOR DEEP NEURAL NETWORKS

CROSS-REFERENCE TO RELATED APPLICATION(S)

This application is a continuation of U.S. patent application Ser. No. 16/900,845, filed Jun. 12, 2020, which claims priority to and the benefit of U.S. Provisional Application No. 63/011,613, filed Apr. 17, 2020, entitled "ACCELERATING CONVOLUTIONAL NEURAL NETWORK WITH SYSTOLIC ARRAY," the entire content of each of which is incorporated herein by reference.

FIELD

One or more aspects of embodiments according to the present disclosure relate to deep neural networks, and more particularly to accelerating computation of deep neural networks in a hardware efficient manner.

BACKGROUND

Deep neural networks may be used by artificial intelligence (AI) machines to perform different types of autonomous tasks. For example, deep neural networks may be used by autonomous vehicles to recognize objects in an environment to move about the environment safely with little or no human input.

An example of a deep neural network is a convolutional neural network (CNN). A convolutional layer of the CNN may include a convolution kernel (also referred to as a filter) which is used to perform a convolution operation with an input feature map. The convolution operation involves performing a dot product operation between kernel weights of the filter and values of the input feature map in a current convolution window over which the filter hovers. The result of the dot product operation is stored in a pixel of an output feature map. The filter is slid over the input feature map by a certain stride value (e.g. stride value=1) to form a new convolution for which another dot product operation is performed. The process continues until the entire input feature map is traversed by the filter, while dot product operations are performed, and the pixels of the output feature map are filled with results of the dot product operations.

As a person of skill in the art should recognize, performing convolution operations may be computationally intensive, and expend energy and take up bandwidth due to repeated multiplication operations and accesses to main memory. Thus, what is desired is a system and method for accelerating computation of one or more convolutional layers in a hardware efficient manner.

SUMMARY

Embodiments of the present disclosure are directed to a computation unit for performing a computation of a layer of a neural network associated with an input tensor, kernel tensor, and output tensor. The computation unit comprises an (R×B) number of processing element (PE) units arranged in an array, where R is a number of inputs in an input dimension of the array, and B is a number of outputs in an output dimension of the array. A first set of input values are provided in parallel in the input dimension of the array during a first processing period, and a second set of input values are provided in parallel in the input dimension of the array during a second processing period. A first and second set of PE units laid out in the output dimension respectively store first and second sets of weight values associated with a particular dimension of the kernel tensor. The first set of PE units is configured to perform parallel computations based on the first set of input values and the first set of weight values during the first processing period, and is further configured to perform parallel computations based on the second set of input values and the first set of weight values during the second processing period. The second set of PE units is configured to perform parallel computations based on the second set of input values and the second set of weight values during the second processing period. The computation unit further comprises a first adder unit coupled to the first set of PE units. The first adder unit is configured to generate a first sum of results of the computations by the first set of PE units during the first processing cycle, and further configured to generate a second sum of results of the computations by the first set of PE units during the second processing cycle. The computation unit also includes a second adder unit coupled to the second set of PE units. The second adder unit is configured to generate a third sum of results of the computations by the second set of PE units during the second processing cycle. The computation unit further includes a first accumulator coupled to the first adder unit, and a second accumulator coupled to the first accumulator and to the second adder unit. The first accumulator is configured to store the first sum generated by the first adder unit, and further configured to shift the first sum to the second accumulator prior to storing the second sum. The second accumulator is configured to receive the first sum for accumulating the first sum with the third sum. The second accumulator is further configured to shift the accumulated first and third sums to memory for being stored as a pixel value of the output tensor. A classification task may then be performed based on the output tensor.

According to one embodiment, the first accumulator is configured to store a partial value for a first pixel of the output tensor, and the second accumulator is configured to store a partial value of a second pixel of the output tensor.

According to one embodiment, the parallel computations include parallel multiplication computations.

According to one embodiment, the first set of input values include a first single input value associated with a first input channel of the input tensor, and a second single input value associated with a second input channel of the input tensor, and the second set of input values include a third single input value associated with the first input channel, and a fourth single input value associated with the second input channel.

According to one embodiment, the first set of input values include a first column of input values in a convolution window for a first input channel of the input tensor, and a second column of input values in a convolution window for a second input channel of the input tensor, and the second set of input values include a third column of input values associated with the convolution window for the first input channel, and a fourth column of input values associated with the convolution window for the second input channel.

According to one embodiment, the convolution window for the first or second input channel has a height corresponding to a kernel height of the kernel tensor, and a width corresponding to a kernel width of the kernel tensor.

According to one embodiment, the particular dimension of the kernel tensor includes a kernel width, wherein the first set of weight values correspond to weight values stored in a first column of the kernel tensor, and the second set of weight values correspond to weight values stored in a second column of the kernel tensor.

According to one embodiment, the plurality of PE units are weight-stationary PE units, wherein the first set of weight values is stored in registers of the first set of PE units, and the second set of weight values is stored in registers of the second set of PE units.

According to one embodiment, the first and third sums are values associated with a first output pixel of the output tensor, and the second sum is a value associated with a second output pixel of the output tensor.

Embodiments of the present disclosure are also directed to a method for performing a computation of a layer of a neural network associated with an input tensor, kernel tensor, and output tensor. The computation is performed via an (R×B) number of processing element (PE) units arranged in an array, wherein R is a number of inputs in an input dimension of the array, and B is a number of outputs in an output dimension of the array. The method comprises storing, by a first and second set of PE units laid out in the output dimension, respectively first and second sets of weight values associated with a particular dimension of the kernel tensor. A first set of input values are received in parallel in the input dimension of the array during a first processing period. The first set of PE units perform parallel computations based on the first set of input values and the first set of weight values. A second set of input values are received in parallel in the input dimension of the array during a second processing period. The first set of PE units perform parallel computations based on the second set of input values and the first set of weight values during the second processing period. A first adder unit coupled to the first set of PE units generates a first sum of results of the computations by the first set of PE units during the first processing cycle. A first accumulator coupled to the first adder unit stores the first sum generated by the first adder unit. The first adder generates a second sum of results of the computations by the first set of PE units during the second processing cycle. A second adder unit coupled to the second set of PE units generates a third sum of results of the computations during the second processing cycle, where the third sum is for being stored in a second accumulator coupled to the second adder unit and the first accumulator. The first accumulator shifts the first sum to the second accumulator prior to the first accumulator storing the second sum. The second accumulator receives from the first accumulator, the first sum for accumulating the first sum with the third sum. The second accumulator shifts the accumulated first and third sums to memory for being stored as a pixel value of the output tensor. A classification task may be performed based on the output tensor.

As a person of skill in the art should appreciate, embodiments of the present disclosure help increase efficiency and throughput/speed of the computations performed by the neural network, by unrolling/parallelizing computation of a CNN layer in one or more dimensions of the input, weight, and output tensors. Embodiments of the present disclosure also increase reusability of input data by providing the input data to the first and second set of PE units, for computing different output pixel values. The reuse of the input data help optimize data movement in and out of main memory.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 6 is a block diagram of a tile configured to unroll computation of a CNN layer in the input channel (C) dimension, kernel height (Fy) dimension, kernel width (Fx) dimension, and output channel (K) dimension, according to one embodiment of the disclosure.

DETAILED DESCRIPTION

Figure 1:
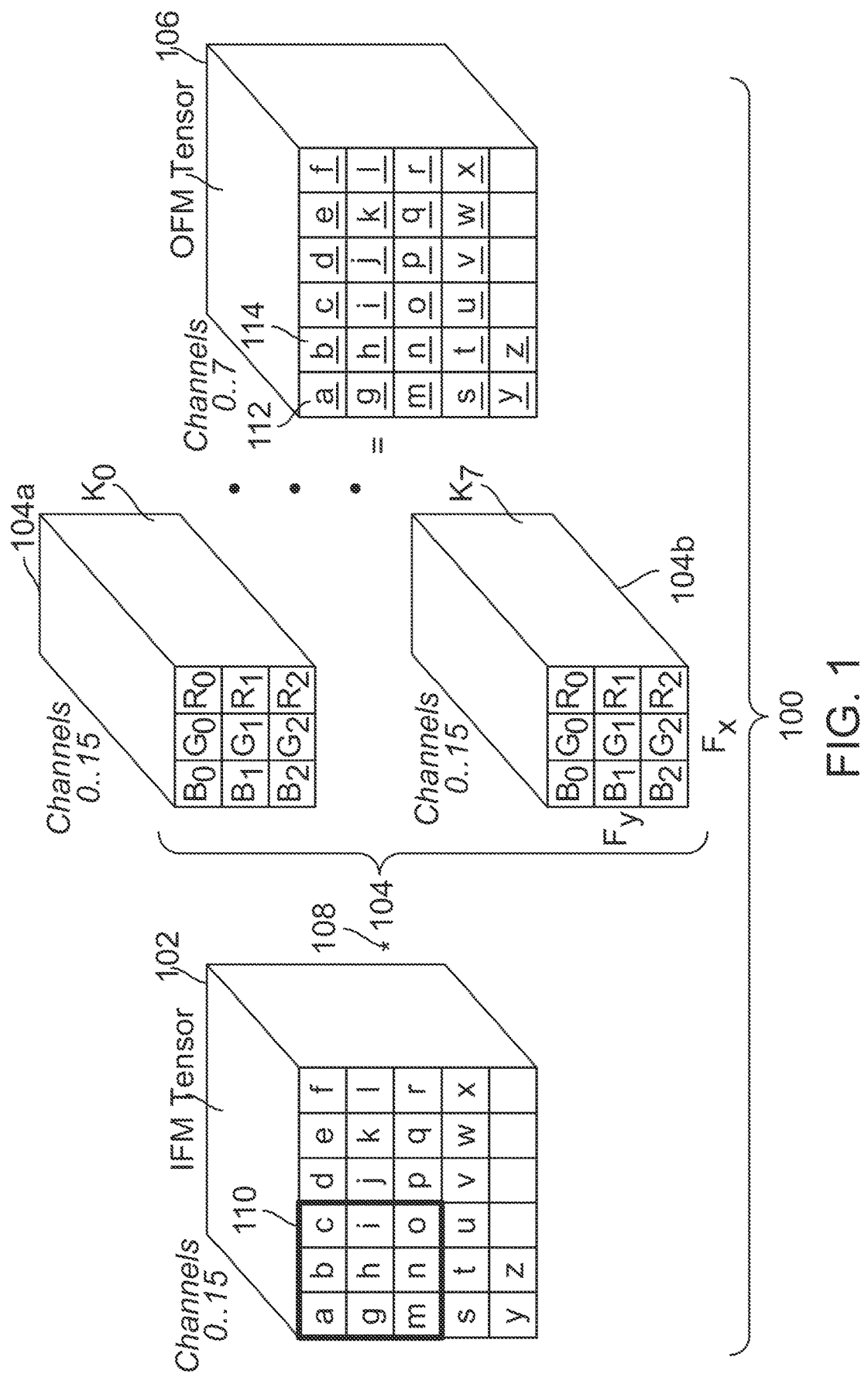
FIG. 1 is a conceptual layout diagram of a convolution layer according to one embodiment of the disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

In general terms, embodiments of the present disclosure are directed to a system and method for accelerating computation of a deep learning algorithm such as, for example, a CNN algorithm. In one embodiment, the system of accelerating computation of the deep learning algorithm includes a computation unit that has a hardware architecture that is aimed in reducing computation latency while optimizing spatial area usage of the substrate utilized by the computation unit.

In one embodiment, computation of the deep learning algorithm may be accelerated by performing at least some of the computations in parallel. In this regard, the system includes a two-dimensional (2D) array of processing element (PE) units configured to "unroll" (also referred to as parallelizing) the computation spatially on the substrate, in one or more dimensions of convolution. The term "unrolling" may be used, herein, to generally refer to parallel computations utilizing the PE units on the substrate. The dimensions of convolution where parallelism may be achieved may include one or more dimensions of the input feature map, convolution kernel, and/or output feature map.

In one embodiment, the 2D array of PE units is invoked for performing dot-product computations for computing a layer of the neural network, such as a convolution layer of the CNN, in parallel. In one embodiment, the PE units are configured to unroll in one or more selected dimensions of the input feature map, convolution kernel, and/or output feature map, and perform parallel dot-product computations in the unrolled dimension(s). The parallelizing may thus accelerate the computation of the neural network layer.

Computation of the deep learning algorithm may also be accelerated by increasing reusability of certain values invoked during the dot-product computations. By increasing re-usage of certain data, movement of the data (also referred to as dataflow) in and out of the main memory may be reduced, helping reduce power usage and computation time.

One embodiment of the present disclosure utilizes a weight stationary dataflow architecture that preloads weight values of the convolution kernel in register files (RFs) close to multiplier units performing the dot-product computations. In this regard, weight data may remain stationary in the register files (also referred to as buffers), while input and output data may flow in and out of the main memory. Although a weight stationary dataflow architecture is used as an example, embodiments of the present disclosure may be adapted to other dataflow architectures such as, for example, output stationary architectures.

In an embodiment where the weight stationary dataflow architecture is employed, movement of non-stationary data may be optimized by reducing the number of times such data is fetched from the main memory. In one embodiment, movement of the input feature data is optimized by reusing the fetched input data for more energy efficiency calculations. In this regard, when particular input data is fetched, the fetched input data is broadcast to various PE units of the array for performing computations for different output channels of the output feature map, and/or for different output pixels of the output feature map for a particular output channel. This may be contrasted to a system that may fetch the input data from memory for performing a computation for one output channel or pixel of the output feature map, and expending power and time to fetch the input data again, for reusing the data in performing a computation for a next output channel or pixel.

In the weight stationary architecture, given that the weight data may be preloaded into the register files of the various PE units, data movement of the weights may be eliminated as the dot product computations are performed. As it should be appreciated, however, larger register files (RFs) may be needed to accommodate different kernel sizes for each PE unit. In the weight stationary architecture, register files are a source of hardware overhead. In one embodiment, the size of register files per PE (RF/PE) is reduced by unrolling in one or two of the kernel dimensions. Decreasing the factor of register files per PE (RF/PE) helps increase hardware efficiency (e.g. area overhead per computation unit).

In one embodiment, spatial area efficiency may be optimized by unrolling the dot product computation in one or more of the kernel dimensions. In one embodiment, a kernel width may be unrolled over various PE units for allowing parallel computations of various pixels of the output feature map using a same input.

In one embodiment, the system for accelerating computation of the deep learning algorithm further includes two or more accumulators/registers that are coupled to one another for forming a systolic array of accumulators. In one embodiment, the accumulators are configured to store partial sums of the output pixels until full sums are computed. The partial sums may be shifted over in a particular direction from a first accumulator to a second neighboring one, orchestrating the computation of partial sums to corresponding pixels of the output feature map.

FIG. 1 is a conceptual layout diagram of a convolution layer (also referred to as a CNN layer) 100 according to one embodiment. The convolution layer 100 includes an input feature map (IFM) 102 storing input feature values, a convolution kernel 104 storing kernel weights, and an output feature map (OFM) 106 storing output feature values resulting from the convolution operation between the IFM and convolution kernel. In one embodiment, the input feature map 102, convolution kernel/filter 104, and output feature map 106 are 3D tensors (e.g. image matrices or tensors), although embodiments of the present invention are not limited thereto.

In one embodiment, the input feature map 102 is a tensor with dimensions (H, W, C), where H denotes an input height, W denotes an input width and C denotes an input channel. The input feature map 102 is also referred to as an input tensor.

In one embodiment, the convolution kernel 104 is a tensor with dimensions (K, C, Fy, Fx), where K denotes an output channel, C denotes the input channel, Fy denotes a kernel height, and Fx denotes a kernel width. The dimensions (K, C, Fy, Fx) of the convolution kernel 104 in the example of FIG. 1 is (8, 16, 3, 3). In one embodiment, a number of filter sets correspond to the number of output channels. In the embodiment of FIG. 1, eight filter sets are used for output channels K0-K7. The convolution kernel 104 is also referred to as a kernel tensor.

In one embodiment, the output feature map 106 is a tensor with dimensions (Ho, Wo, and K), where Ho denotes an output height, Wo denotes an output width, and K denotes the output channels. The output feature map 106 is also referred to as an output tensor.

A computation of the convolution layer 100 includes performing a dot product operation 108 between the input values/pixels of a convolution window 110 and the weights of the convolution kernel 104, for the input channels (e.g. input channels 0-15) of the input feature map 102. The result of the dot product operation is saved in an output pixel 112 of the output feature map 106 for a particular output channel. For example, assuming use of the input values and filter weights in the example of FIG. 1, the value of output pixel 112 is computed according to the following formula: (a*B0+ g*B1+m*B2+b*G0+h*G1+n*G2+c*R0+i*R1+o*R2), where the dot product computation is repeated for the input values in the convolution window 110 for the other input channels, and summed together for rendering a final output pixel value a.

Table 1 is a pseudocode for computing one convolution layer recursively via nested "for loops" based on the input tensor 102, kernel tensor 104, and output tensor 106.

TABLE 1

```
for h in [0:Ho]: #loop 1
  for w in [0:Wo]: # loop 2
    for f1 in [0:Fy]: # loop 3
    |  for f2 in [0:Fx]: # loop 4
    |  |  for i in [0:C]: # loop 5
```

TABLE 1-continued

```
| | | for j in [0:K]: # loop 6
| | |   OFM[j][h][w] += IFM[i][h x s +
| | |     f1][w x s + f2] x Kernel[j][i][f1][f2]
```

The computation unit according to an embodiment of the disclosure allows unrolling of the computation of one or more (e.g. up to six) "for loops" while optimizing hardware overhead by increasing reusability of data, such as, for example, input feature map data. As will be appreciated, the unrolling of a computation performed in a particular "for loop," and performing the computation in parallel by the PE units, helps eliminate iterative execution of the "for loop," which in turn helps accelerate computation of a convolution layer.

Figure 2:
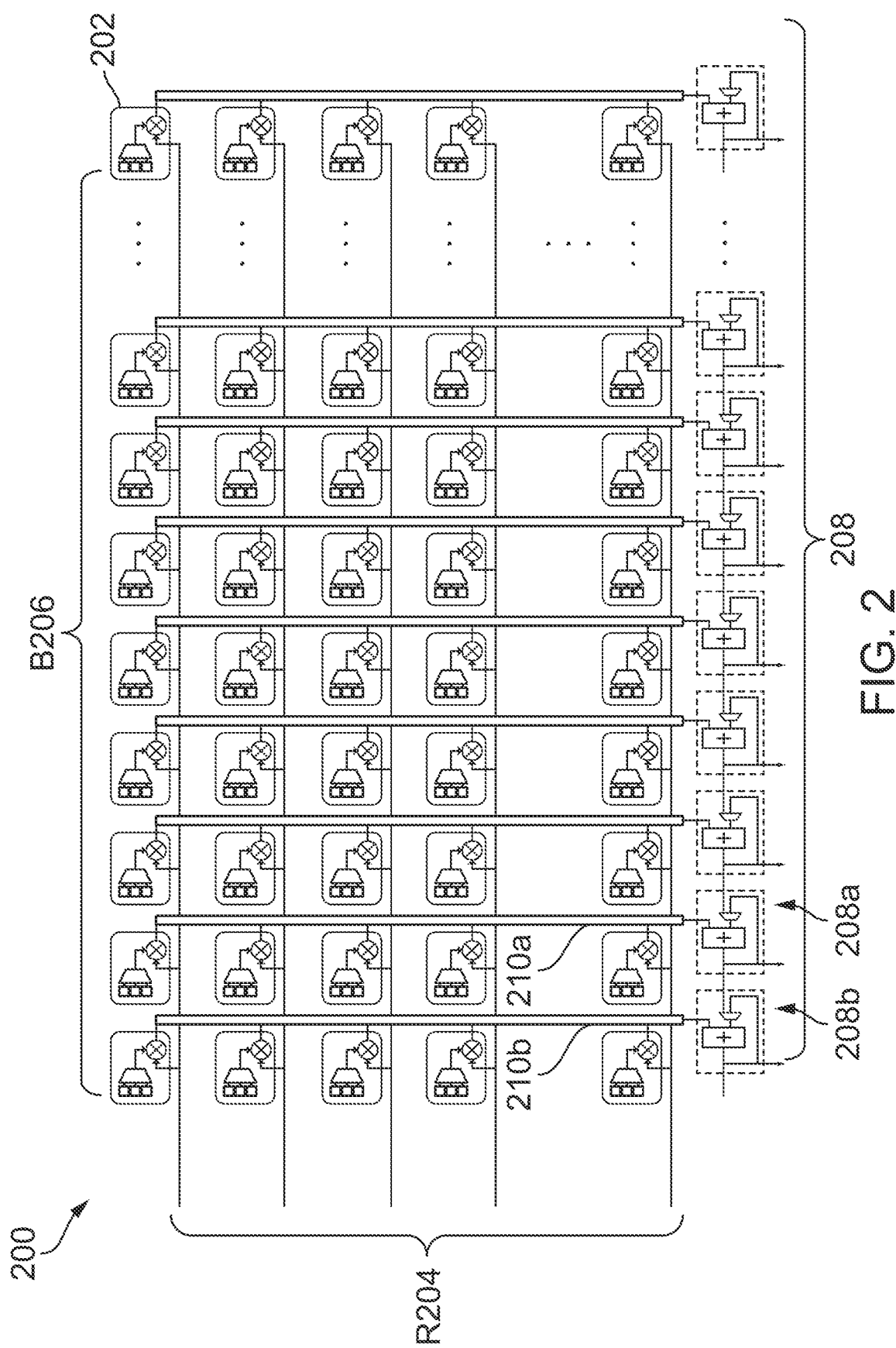
FIG. 2 is a block diagram of a computation unit for computing a convolution layer according to one embodiment of the disclosure.

FIG. 2 is a block diagram of a computation unit (also referred to as a tile) 200 for computing a convolution layer according to one embodiment of the disclosure. The tile includes (R×B) number of PE units 202 arranged in an array, such as, for example, a two-dimensional array, where R is a number of inputs in an input dimension (e.g. a number of rows) 204, and B is a number of outputs in an output dimension (e.g. a number of columns) 206. In one embodiment, input data is provided to the rows in the tile input dimension 204 for performing parallel calculations by the PE units and generating various outputs.

The dimension of a particular tile, and/or total number of tiles, may depend on the area budget of the substrate on which the tile(s) are built. A smaller area may call for a fewer number of PE units in a tile, and a larger area may call for a larger number of PE units. In some embodiments, convolution calculations may be conducted in stages in scenarios where the number of PE units are less than a size of a particular convolution dimension that is being unrolled for parallel execution by the PE units. For example, assume that input channels of the input feature map are to be unrolled in the tile input dimension 204. Further assume that the number of input channels to be unrolled is 16, but the number of rows in the tile input dimension is 10. In this scenario, 10 of the 16 input channels may be unrolled in a first stage of computation, utilizing the 10 rows of the tile, and the remaining 6 input channels are unrolled in a second stage of computation. In the second stage, 6 of the 10 rows of the tile are used for unrolling the remaining 6 input channels. The above example is merely an illustrative example to which the disclosed subject is not limited.

In one embodiment, the tile 200 further includes B number of adder trees (also referred to as adder units) 210 corresponding to the B number of outputs in the output dimension 206 of the tile. An output of the PE units in a same column of the tile may be reduced using the adder tree (e.g. adder tree 210a) associated with the column. In this regard, the adder tree may include one or more adder logic circuits configured to add results of computations performed by the PE units in the column, to calculate a dot product result for the column.

The tile 200 may also include B number of accumulators 208 that are coupled to the B number of adder trees and to each other to form a systolic array. The accumulators may take the form of registers and addition logic, where a particular register (e.g. register 208a) associated with a particular column of the tile, temporarily stores the accumulated sum provided by the corresponding adder tree (e.g. adder tree 210a) along with the current register value. Thus, the accumulator's new register value is the sum of the adder tree output and the current register value. Given that, according to one embodiment, the accumulators 208 form a systolic array, a particular accumulator (e.g. accumulator 208a) is configured to shift a value that it stores, to a downstream neighboring accumulator (e.g. accumulator 208b). Although according to the various embodiments the systolic array is deemed to shift data from right to left, a person of skill in the art should recognize that data may also shift from left to right without departing from the spirit and scope of the inventive concept.

Figure 3:
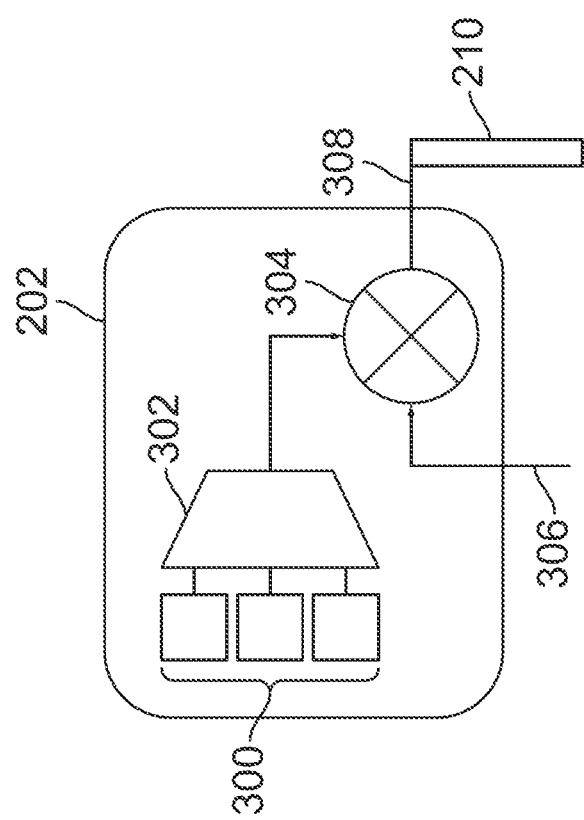
FIG. 3 is a more detailed block diagram of a processing unit according to one embodiment of the disclosure.

FIG. 3 is a more detailed block diagram of the PE unit 202 according to one embodiment of the disclosure. The PE unit 202 may include one or more registers (also referred to as register files) 300, a multiplexor 302, and multiplier logic 304. The registers 300 may also be referred to as buffers.

The registers 300 may be preloaded with data used by the multiplier logic 304 to perform a multiplication operation. In one embodiment, the registers 300 store a column of kernel weights (e.g. B0, B1, B2) of the convolution kernel 104. An appropriate weight value (e.g. B1) may be selected by the multiplexor 302 for being used by the multiplier unit 304 to perform a multiplication operation between a received input data (e.g. input g) 306, and the selected weight value. The received input data may be, for example, a value of the input feature map. A result 308 of the multiplication operation is output to the adder tree 210 for being added with outputs of other multiplication operations by other PE units in the same column.

In one embodiment, the computation unit 100 is configured to unroll computation of the convolution layer in three dimensions (associated with three "for-loops") of convolution, such as, for example, the input channel (C), kernel width (Fx), and output channel (K). In one embodiment, the input channel (C) is unrolled/parallelized in the tile input dimension 204, and the kernel width (Fx) and output channel (K) are unrolled in the tile output dimension 206. By unrolling of the convolution computation spatially in multiple dimensions of the input, weight, and output tensors, latency of the computation may be reduced.

FIGS. 4A-4J (collectively referred to as FIG. 4) are block diagrams of a tile 100a (similar to tile 100 of FIG. 2) configured to unroll computation of a CNN layer in the input channel (C) dimension, kernel width (Fx) dimension, and output channel (K) dimension. The values of the CNN layer of FIG. 1 are used for illustration purposes. In the example of FIG. 1, the convolution kernel 104 has dimensions (K, C, Fy, Fx)=(8, 16, 3, 3). The value of the stride by which the filter 104 slides over the input feature vector 102, is assumed to be one.

The dimension of the tile 100a in the example of FIG. 4 is 16×24, with 16 rows of PE units 202 in a tile input dimension 204a, and 24 columns of PE units in a tile output dimension 206a. In unrolling the 16 input channels (C) of the input feature map 110 of FIG. 1 in the tile input dimension 204a, a single input value of the input feature map 102 for each of the 16 input channels is provided as input data to the 16 rows of the tile, in parallel.

In unrolling three columns of kernel weights in the kernel width (Fx) dimension for eight output channels (K0-K7), 24 columns of the tile in the tile output dimension 206a may be used. In one embodiment, tile 100a is a weight-stationary tile, where a column of kernel weight values is stored (e.g. preloaded) in register files 300 (FIG. 3) of particular PE units 202. In the example of FIG. 4, for output channel K0, the PE units in column 400 of the tile store the kernel weight values (B0-B2) of column 406 of the convolution kernel 104a, PE units in column 402 of the tile store the kernel weight values (G0-G2) of column 408 of the kernel, and PE units in column 404 of the tile store the kernel weight values (R0-R2) of column 410 of the kernel. In one embodiment, a particular register in the tile column stores the kernel column of its corresponding input channel. For example, register 460 in column 404 stores kernel column 410 at input channel 0, register 462 in column 404 also stores kernel column 410 but at input channel 1, and so on, for the various input channels. The remaining columns of the tile store kernel weight columns of the remaining output channels K1-K7.

In the example of FIG. 4, each set of kernel weight columns 406-410 may be used to calculate three pixels (e.g. pixels a, b, c) of the output feature map 106, using a same input of the input feature map 102. The reuse of the input data reduces trips to the main memory, thereby allowing the computations to be performed in a more energy and time efficient manner.

In one embodiment, input feature values of a first convolution window 110a are fed sequentially in the tile input dimension 204a for performing a dot product computation with a corresponding kernel weights of the convolution kernel 104. In this regard, in the example of FIG. 4, the input feature data in the convolution window 110a, is fed sequentially as input data for the tile in the following order: a, g, m, b, h, n, c, i, and o. As pixel data in a first column 430 ($a$, $g$, $m$) is fed to the rows 412-416 of the tile, the output of a first column (e.g. column 400) of every set of three columns (e.g. columns 400-404) of the tile correspond to output pixel a. In this regard, accumulator for the first column (e.g. accumulator 424) holds a partial sum of pixel "a" for channel 0 (referred to as $a_0$). In the example of FIG. 4, accumulator 424 is arranged in a systolic array along with accumulators 426 and 428. Accumulators 424-428 may be similar to the accumulators 208 of FIG. 2.

Before pixel data of a second column 432 ($b$, $h$, $n$) of the first convolution window 110a is fed to the rows 412-416 of the tile, the partial sum of $a_0$ is shifted to a neighboring accumulator (e.g. accumulator 426) in the systolic array. As data in the second column 432 of the first convolution window 110a is fed, the accumulator for the first column of the tile (e.g. accumulator 424) accumulates a partial sum of output pixel "b" for channel 0 (referred to as $b_0$), and the accumulator for the second column of the tile (e.g. accumulator 426) accumulates a new partial sum of $a_0$, which is added to the partial sum of $a_0$ received from accumulator 424.

Once the dot product computations using the data of the second column 432 of the first convolution window 110a are complete, the partial sums of the systolic array are moved one more step to a downstream accumulator, and pixel data of a third column 434 (c, i and o) of the first convolution window 110a is fed to the rows 412-416 of the tile. As the data of the third column 434 of the first convolution window 110a is fed, the accumulator for the first column (e.g. accumulator 424) accumulates a partial sum of output pixel "c" for channel 0 (referred to as $c_0$), the accumulator for the second column (e.g. accumulator 426) accumulates the partial sum of output pixel $b_0$, and the accumulator for the third column of the tile (e.g. accumulator 428) accumulates the particular sum of output pixel $a_0$.

Once the data of the first convolution window 110a has been convolved with the weights of the convolution kernel 104, the accumulated sum of output pixel $a_0$ is dispatched to the main memory as final output pixel $a_0$ for the output feature map 106, emptying the accumulator holding the accumulated sum. The convolution window may then slide by one stride value over the input feature map, for creating a second convolution window 110b (FIG. 4J). The second convolution window 110b contains a new column 436 of input pixel data (d, j, p) for which dot product computations have not yet been performed with the weights of the filter kernel 104. However, dot product computations performed so far involving the input data of columns 432 and 434 are maintained in accumulators 428 and 426, respectively, and need not be re-computed for the second convolution window.

The convolution window continues to slide over the input feature map based on the stride value until a first row 438 of the of the output feature map 106 is filled.

The above process repeats for a next row 440 of the output feature map 106 until all values of the output feature map have been filled.

The above embodiment of feeding the input values sequentially is described in more detail herein, using the values of the CNN layer of FIG. 1 is used as an example. For purposes of simplicity, the description is limited to the computation of output pixels $a_0$, $b_0$, and $c_0$, for output channel K0. The description may extend to the computation of remaining output pixels for output channel K0, as well as output pixels for remaining output channels K1-K7.

Figure 4A:
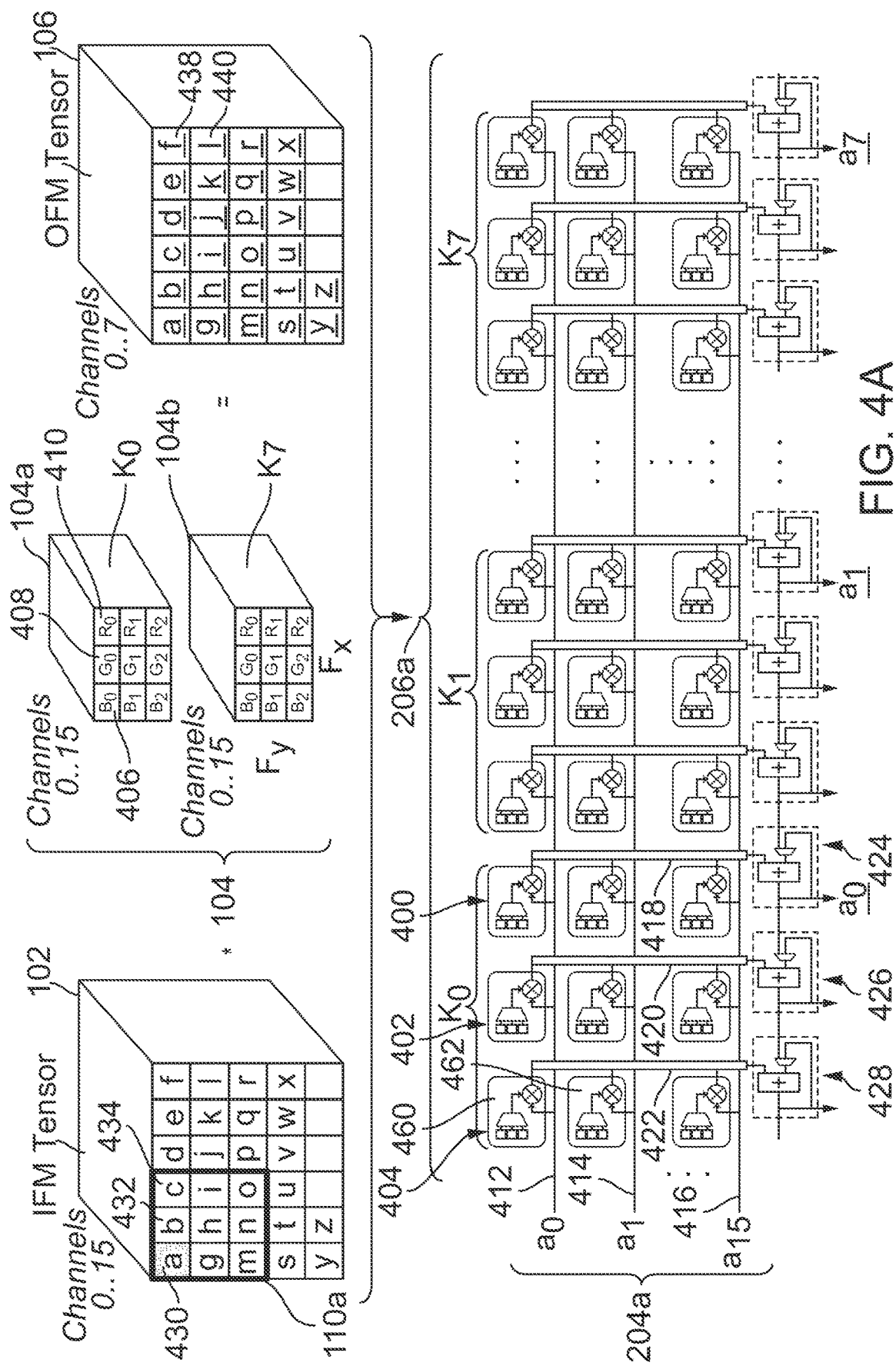
FIGS. 4A-4J are block diagrams of a tile 100 configured to unroll computation of a CNN layer in the input channel (C) dimension, kernel width (Fx) dimension, and output channel (K) dimension, according to one embodiment of the disclosure.

With reference to FIG. 4A, the computation begins, and a first input pixel value (a) in the first column 430 of the first convolution window 110a for the various input channels (inputs $a_0$-$a_{15}$) are retrieved from main memory in a first processing cycle, and fed to the PE units in the tile input dimension 204a. For example, input $a_0$ is fed to the PE units in row 412 of the tile, input $a_1$ is fed to the PE units in row 414 of the tile, and input $a_{15}$ is fed to the PE units in row 416 of the tile. In performing the convolution computation during the first processing cycle, inputs $a_0$-$a_{15}$ are multiplied with weight B0 of kernel column 406 (in the various input channels), which is stored in the PE units of column 400 of the tile, for generating a partial sum of output pixel $a_0$. The PE units of columns 402 and 404 of the tile that store other kernel weights, refrain from performing a multiplication operation with the received inputs $a_0$-$a_{15}$. The multiplication operation using inputs $a_0$-$a_{15}$ is also performed by appropriate columns of the tile (e.g. every third column) during the first processing cycle, for output dimensions K1-K7, for accumulating partial sums of output pixels $a_1$-$a_7$ for these output dimensions.

The output of the multiplication operation by the PE units in column 400 of the tile are added by adder tree 418 (similar to adder tree 210), and temporarily stored in the accumulator 424 assigned to column 400.

Figure 4B:
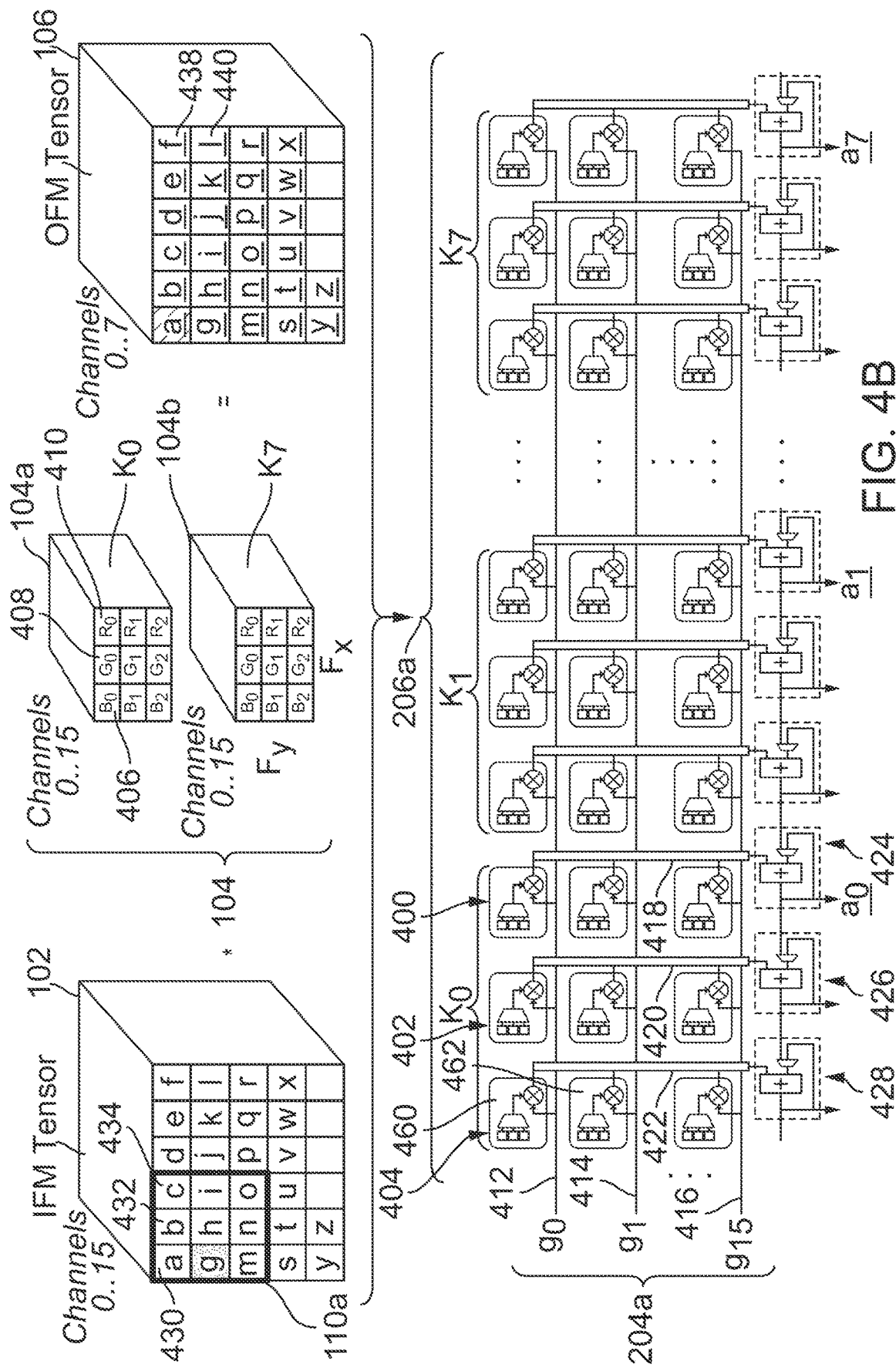

Referring to FIG. 4B, a second input pixel value (g) of the first column 430 of the first convolution window 110a for the various input channels (inputs $g_0$-$g_{15}$) are fed to the PE units in the tile input dimension 204a during a second processing cycle. In performing the convolution computation during the second processing cycle, inputs $g_0$-$g_{15}$ are multiplied with weight B1 of kernel column 406 (in the various input channels), which is also stored in the PE units of column 400 of the tile, for being added to the partial sum of output pixel $a_0$ stored in accumulator 424. The PE units of columns 402 and 404 of the tile that store other kernel weights, again refrain from performing a multiplication operation with the received inputs $g_0$-$g_{15}$.

Figure 4C:
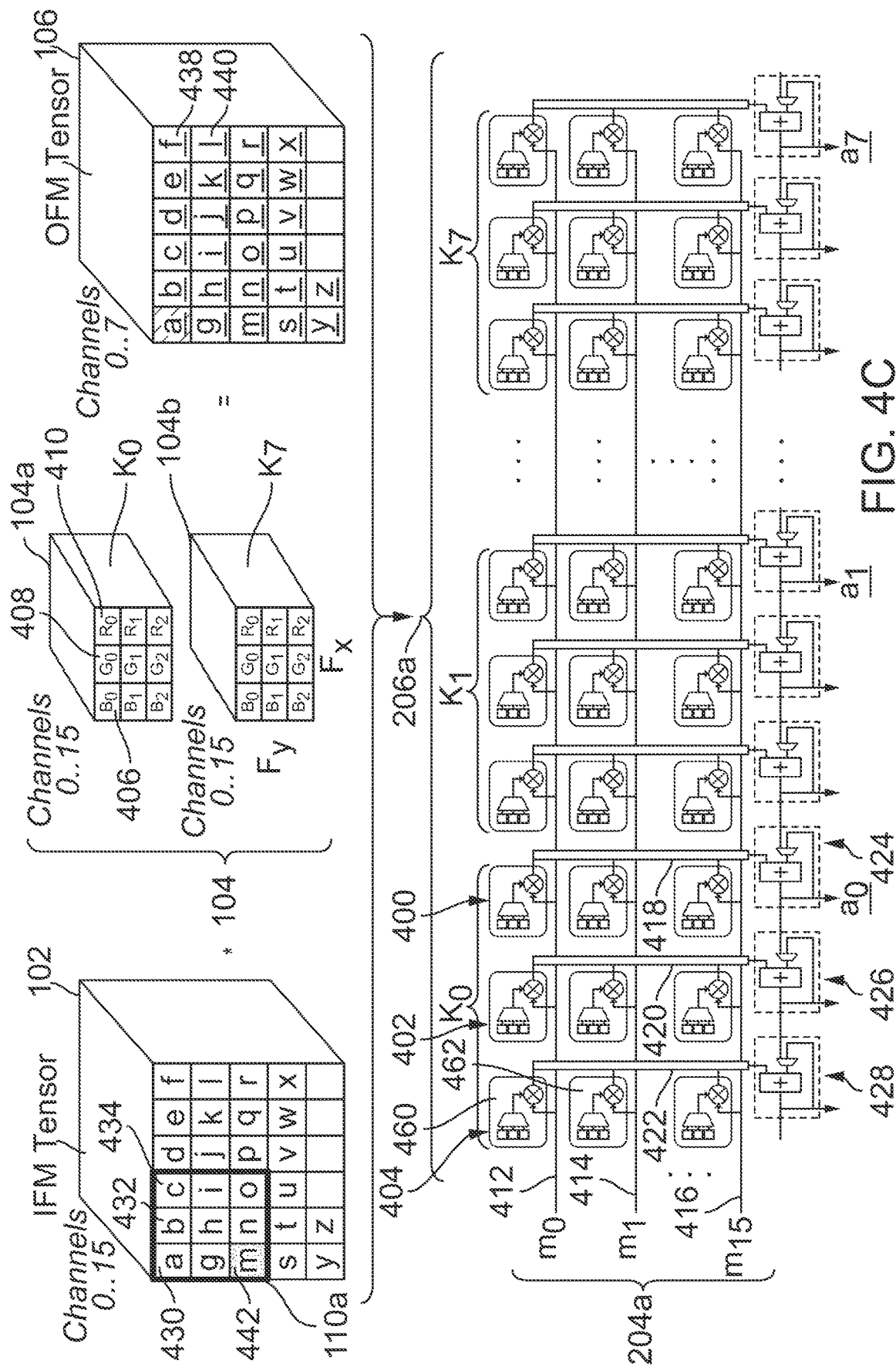

Referring to FIG. 4C, a third input pixel value (m) of the first column 430 of the first convolution window 110a for the various input channels (inputs $m_0$-$m_{15}$) are fed to the PE units in the tile input dimension 204a during a third processing cycle. In performing the convolution computation during the third processing cycle, inputs $m_0$-$m_{15}$ are multiplied with weight B2 of kernel column 406 (in the various input channels), which is also stored in the PE units of column 400 of the tile, for being added to the partial sum of output pixel $a_0$ stored in accumulator 424, and computation of the first column 430 of the convolution window 110a completes.

Before data of a second column 432 (b, h, n) of the convolution window is fed to the PE units in the tile input dimension 204a, the partial sum of output pixel $a_0$ in accumulator 424 is shifted to accumulator 426 in the systolic array, emptying accumulator 424. The second column 432 (b, h, n) of the first convolution window 110a may now be fed to the tile, for computing partial sums of b$_0$th output pixels $a_0$ and $b_0$, based on the same input data (b, h, n).

Figure 4D:
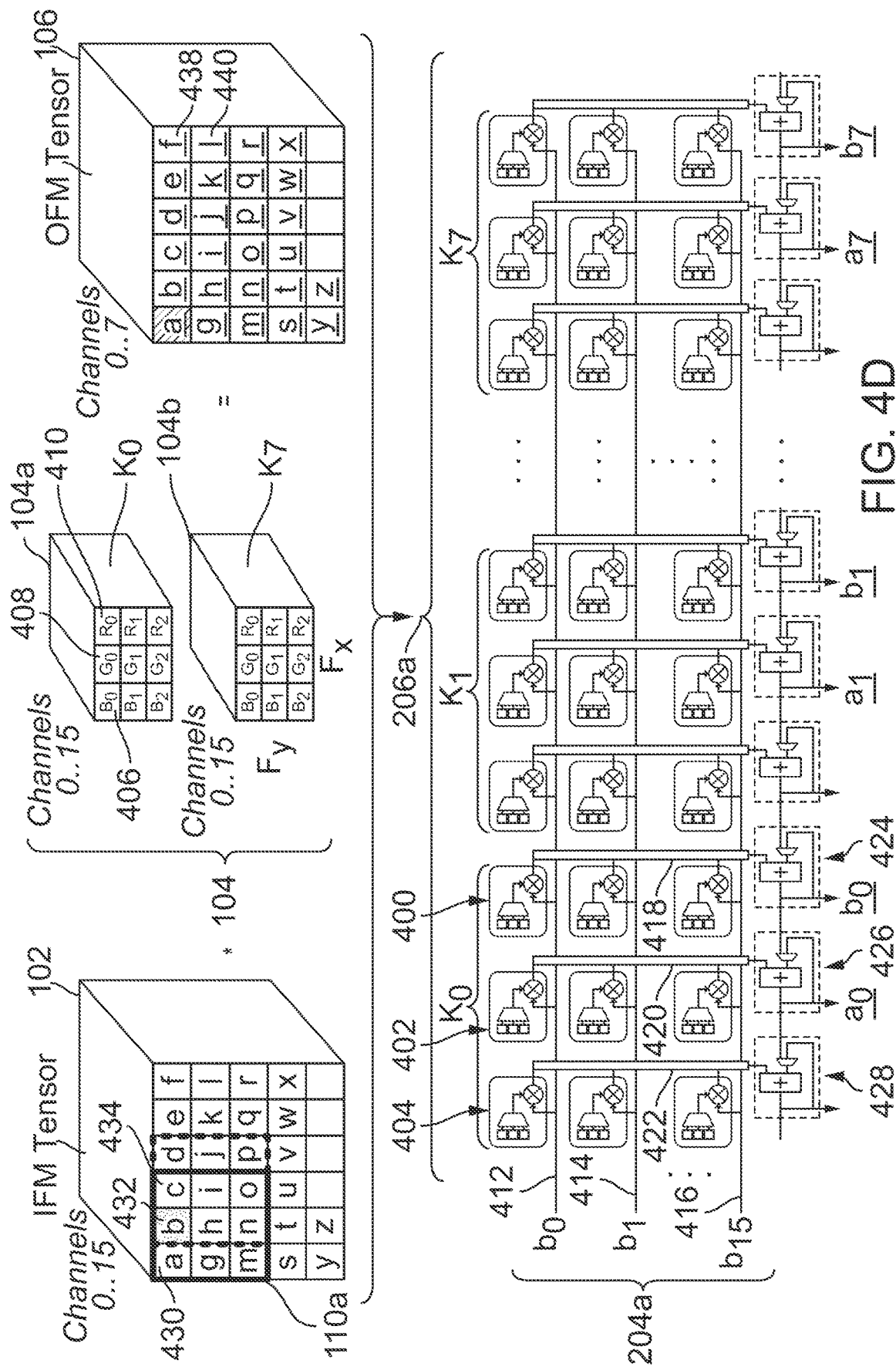

In this regard, and referring to FIG. 4D, a first input pixel value (b) in the second column 432 of the first convolution window 110a for the various input channels (inputs $b_0$-$b_{15}$) are fed to the PE units in the tile input dimension 204a during a fourth processing cycle. In performing the convolution computation during the fourth processing cycle, inputs $b_0$-$b_{15}$ are multiplied with weight B0 of kernel column 406 (in the various input channels), which is stored in the PE units of column 400 of the tile, for generating a partial sum of output pixel $b_0$. The output of the multiplication operation by the PE units in column 400 of the tile are added by the adder tree 418, and temporarily stored in the accumulator 424 assigned to column 400, which has now been emptied, and may now store the partial sum of output pixel $b_0$.

In addition, inputs $b_0$-$b_{15}$ are multiplied with weight G0 of kernel column 408 (in the various input channels), which is stored in the PE units of column 402 of the tile, for continuing to compute the partial sum of output pixel $a_0$. The output of the multiplication operation by the PE units in column 402 of the tile are added by the adder tree 420, and provided to accumulator 426 for being accumulated with the partial sum of $a_0$ from the previous step, received from accumulator 424. The PE units in column 404 of the tile that stores other kernel weights, refrain from performing a multiplication operation with the received inputs $b_0$-$b_{15}$.

Figure 4E:
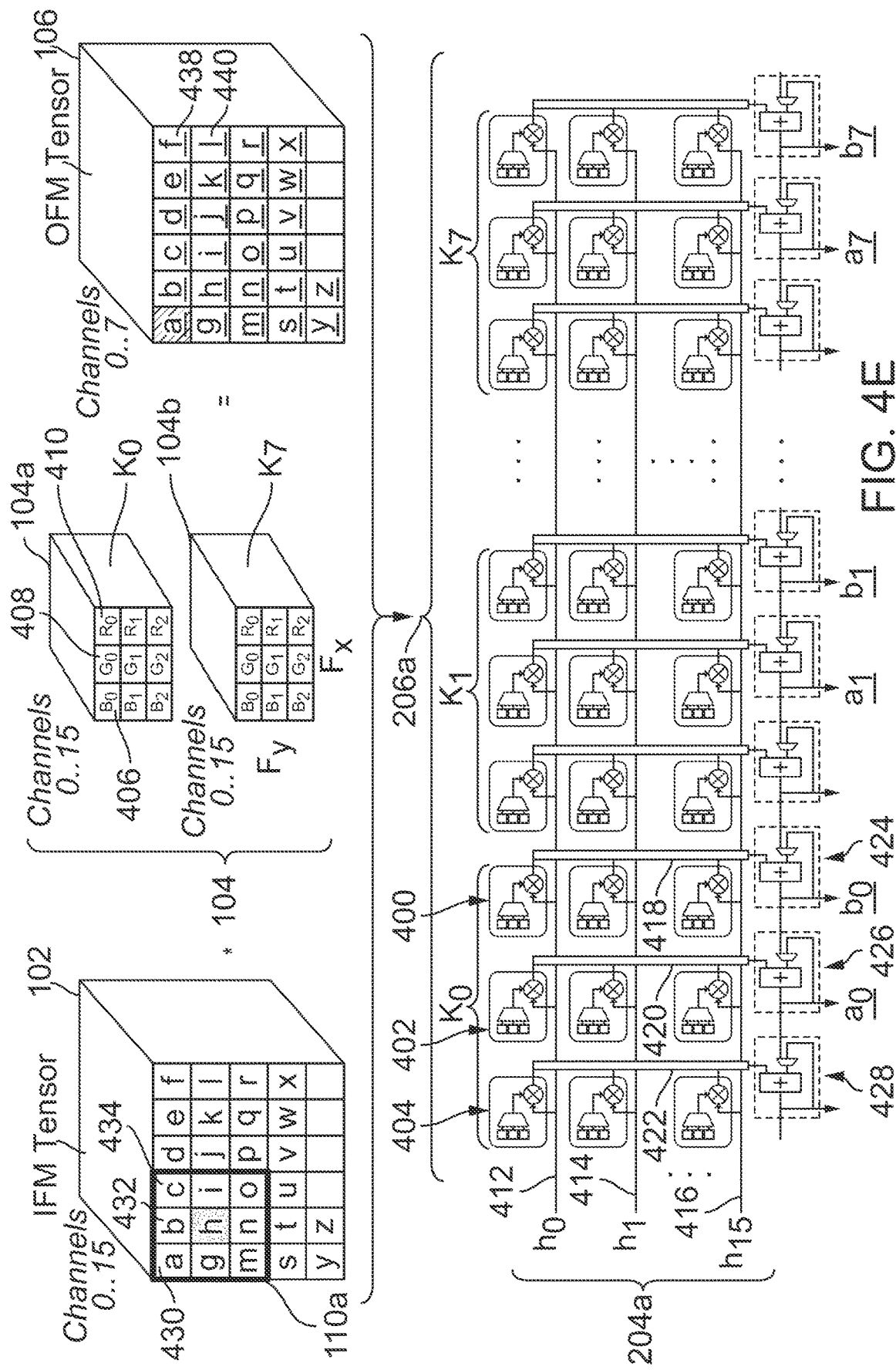
Figure 4F:
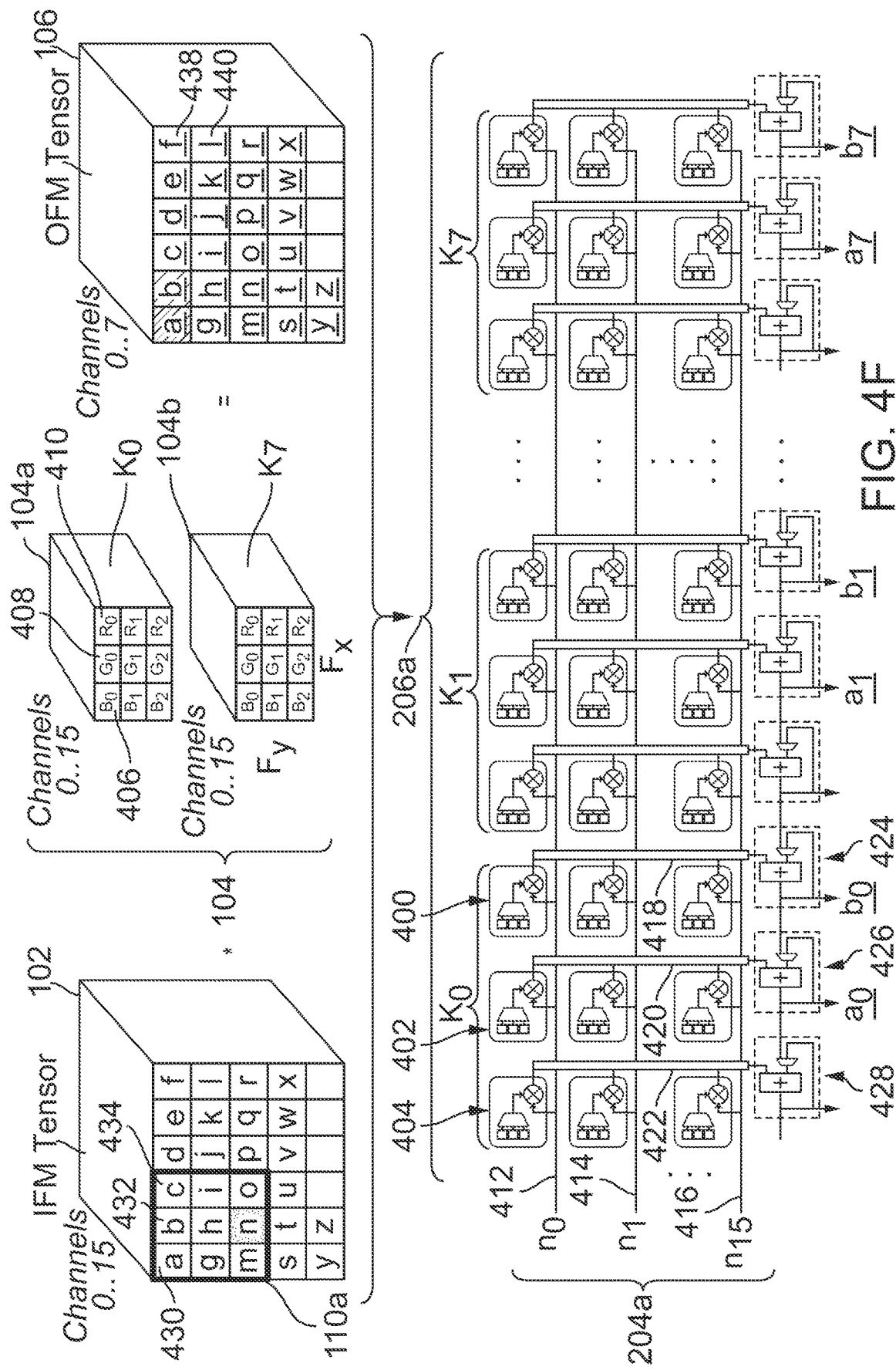

As depicted in FIGS. 4E and 4F, the process continues with input values "h" and "n" in the second column 432 of the first convolution window 110a, for continuing to compute partial sums of output pixels $a_0$ and $b_0$, for being accumulated in accumulators 426 and 424, respectively. In this regard, input pixel value "h" is multiplied with weight B1 of kernel column 406 (in the various input channels), which is stored in the PE units of column 400 of the tile, for further contributing to the partial sum of output pixel $b_0$ maintained in accumulator 424. Input value "h" is also multiplied with weight G1 of kernel column 408 (in the various input channels), which is stored in the PE units of column 402 of the tile, for further contributing to the partial sum of output pixel $a_0$ maintained in accumulator 426. Furthermore, input value "n" is multiplied with weight B2 of kernel column 406 (in the various input channels), which is stored in the PE units of column 400 of the tile, for further contributing to the partial sum of output pixel $b_0$ maintained in accumulator 424. Input value "n" is also multiplied with weight G2 of kernel column 408 (in the various input channels), which is stored in the PE units of column 402 of the tile, for further contributing to the partial sum of output pixel $a_0$ maintained in accumulator 426.

When the computation of the second column 432 of the first convolution window 110a completes, the partial sum of output pixel $a_0$ in accumulator 426 is shifted to accumulator 428, and the partial sum of output pixel $b_0$ in accumulator 424 is shifted to accumulator 426. The third column 434 (c, i, o) of the first convolution window 110a may now be fed to the tile, for computing partial sums of all three output pixels $a_0$ $b_0$ and $c_0$, using input data (c, i, o).

Figure 4G:
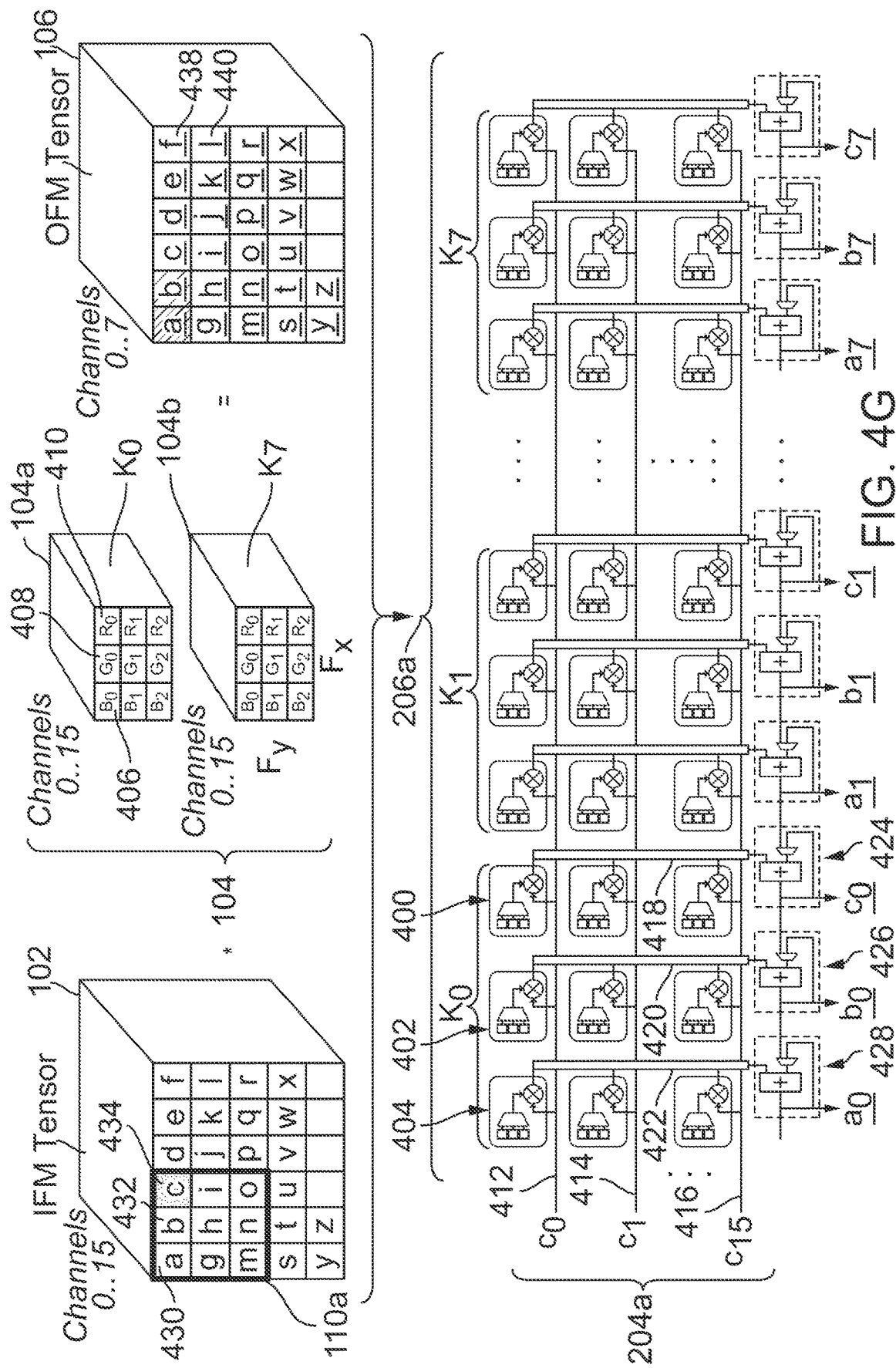
Figure 4H:
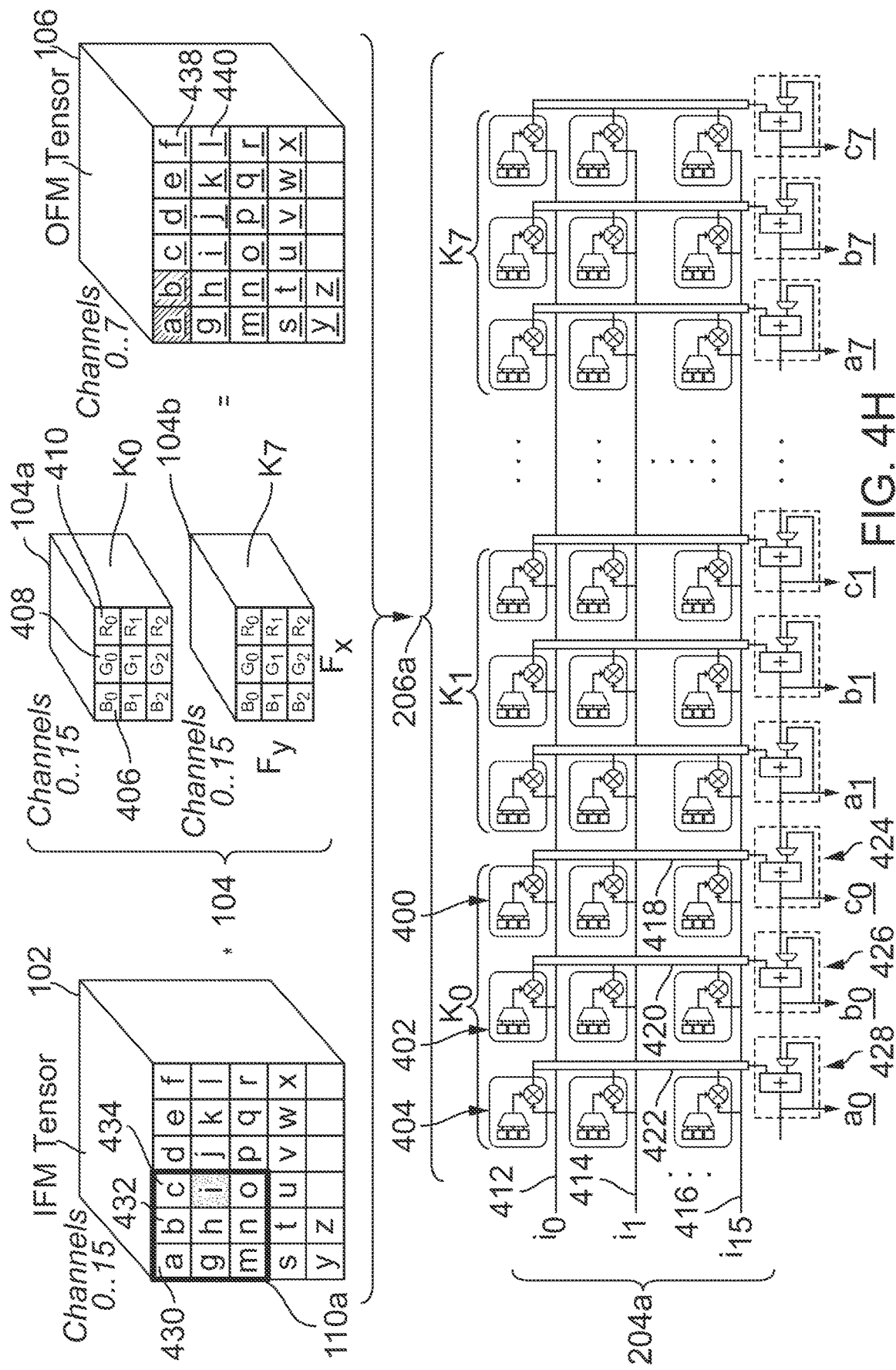
Figure 4I:
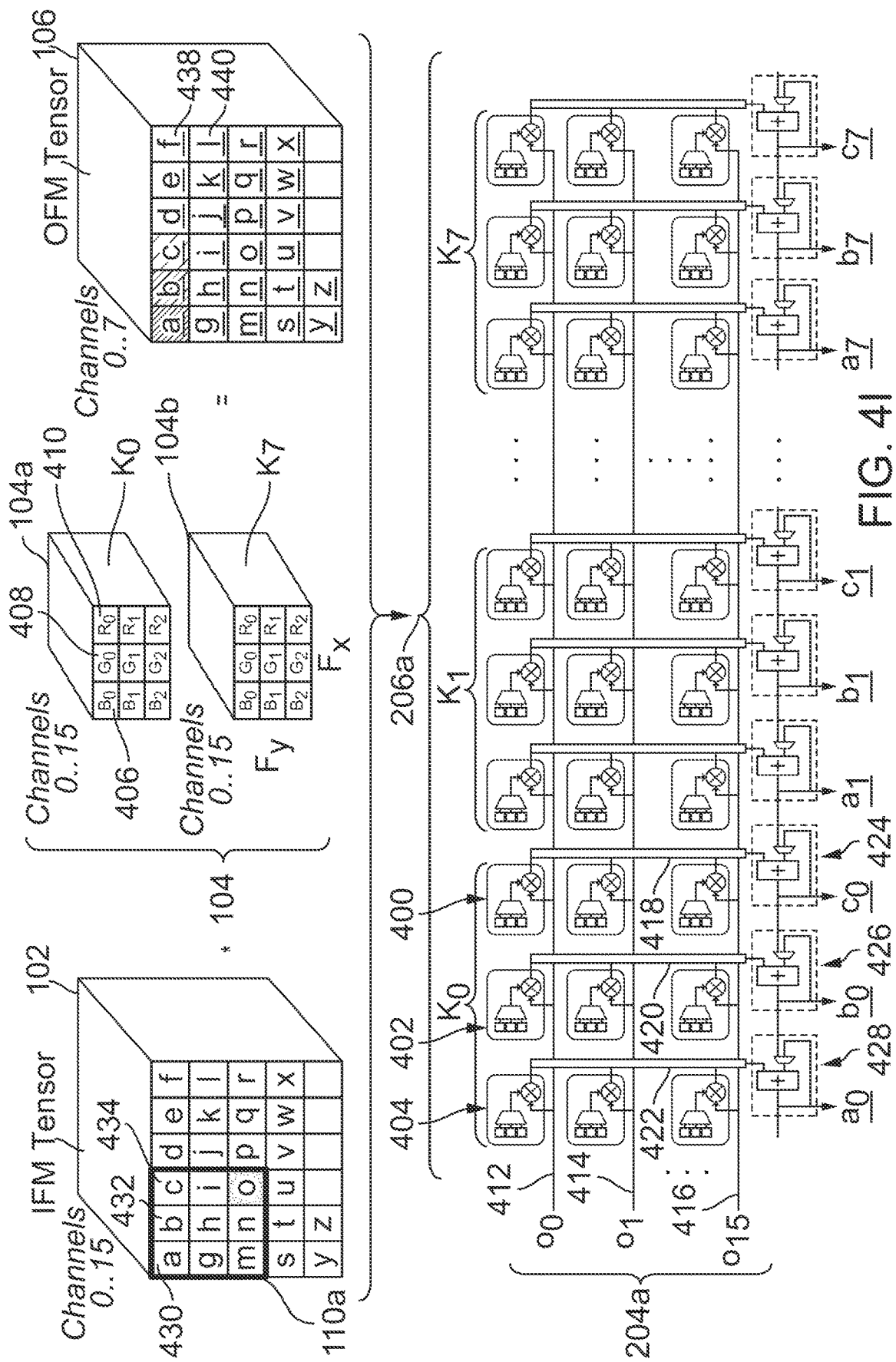
Figure 4J:
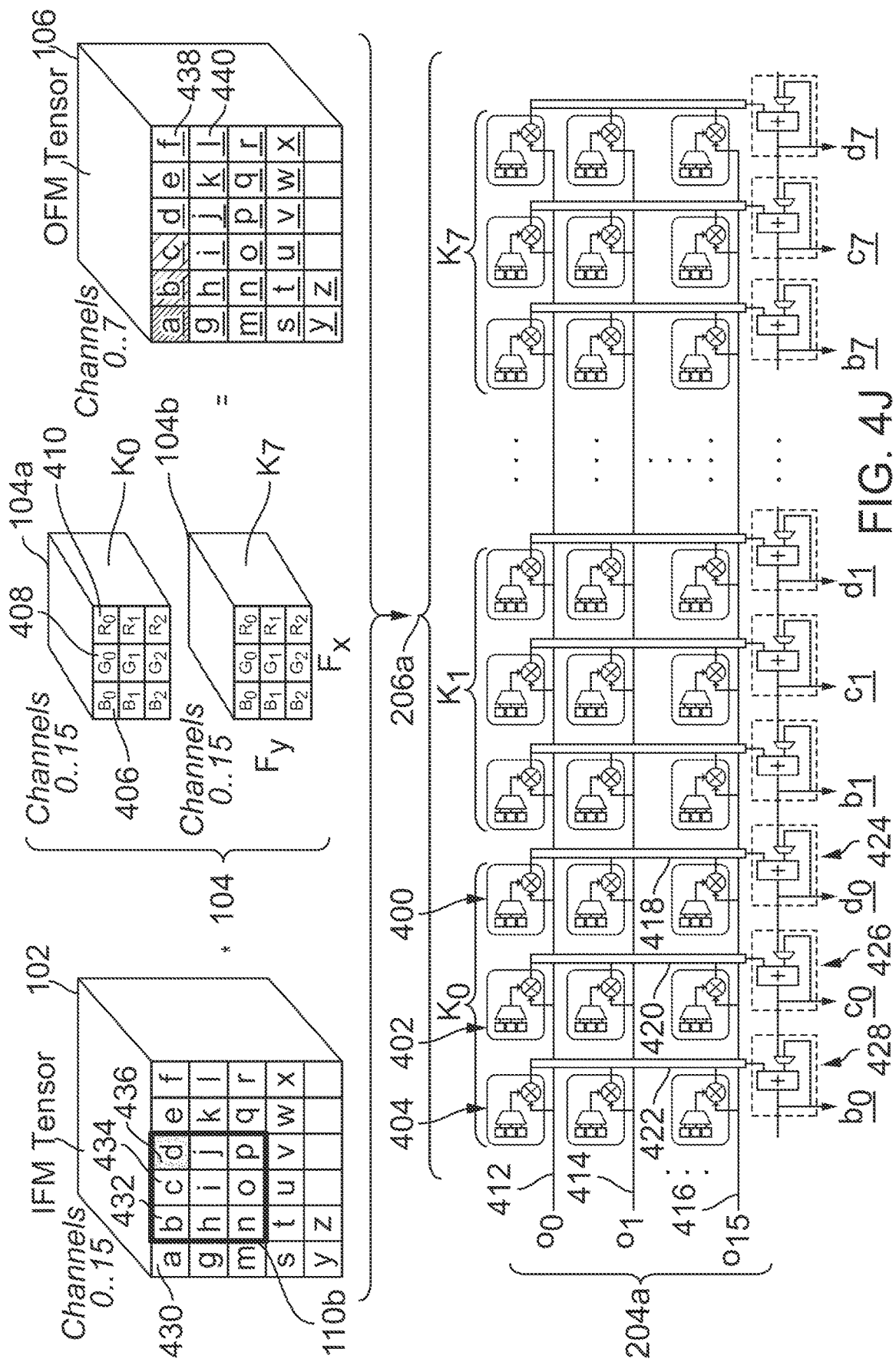

In this regard, and referring to FIGS. 4G-4I, the input values (c, i, o) in the third column 434 of the first convolution window 110a are fed in sequence to the PE units in the tile input dimension 204a. In performing the convolution computation, inputs $c_0$-$c_{15}$ are multiplied with weight B0 of kernel column 406 in the various input channels (stored in the PE units of column 400 of the tile), for generating a partial sum of output pixel $c_0$, and further multiplied with weight G0 of kernel column 408 in the various input channels (stored in the PE units of column 402 of the tile), for generating a partial sum of output pixel $b_0$, and still further multiplied with weight R0 of kernel column 410 in the various input channels (stored in the PE units of column 404 of the tile), for generating a partial sum of output pixel $a_0$.

Inputs $i_0$-$i_{15}$ are multiplied with weight B1 of kernel column 406 in the various input channels (stored in the PE units of column 400 of the tile), for generating a partial sum of output pixel $c_0$, and further multiplied with weight G1 of kernel column 408 in the various input channels (stored in the PE units of column 402 of the tile), for generating a partial sum of output pixel $b_0$, and still further multiplied with weight R1 of kernel column 410 in the various input channels (stored in the PE units of column 404 of the tile), for generating a partial sum of output pixel $a_0$.

Inputs $o_0$-$o_{15}$ are multiplied with weight B2 of kernel column 406 in the various input channels (stored in the PE units of column 400 of the tile), for generating a partial sum of output pixel $c_0$, and further multiplied with weight G2 of kernel column 408 in the various input channels (stored in the PE units of column 402 of the tile), for generating a partial sum of output pixel $b_0$, and still further multiplied with weight R2 of kernel column 410 in the various input channels (stored in the PE units of column 404 of the tile), for generating a partial sum of output pixel $a_0$. The computation of the first convolution window 110a terminates, and the accumulated sum of output pixel $c_0$ in accumulator 424 shifts to accumulator 426, and the accumulated sum of output pixel $b_0$ in accumulator 426 shifts to accumulator 428. The accumulated sum of output pixel $a_0$ in accumulator 428 is emptied and saved in the main memory as the final output pixel $a_0$ of the output feature map 106.

Having completed the computation of the first convolution window 110a, the window moves over the input feature map 102 by a stride value of one, and the second convolution window 110b is formed with next three columns 432-436 of input feature data. The second convolution window 110b contains a new column 436 of input data (d, j, p) for which dot product computations have not yet been performed with the weights of the filter kernel 104. However, dot product computations performed so far involving the input data of columns 432 and 434 are maintained in accumulators 428 and 426, respectively, and need not be re-computed for the second convolution window.

Figure 5:
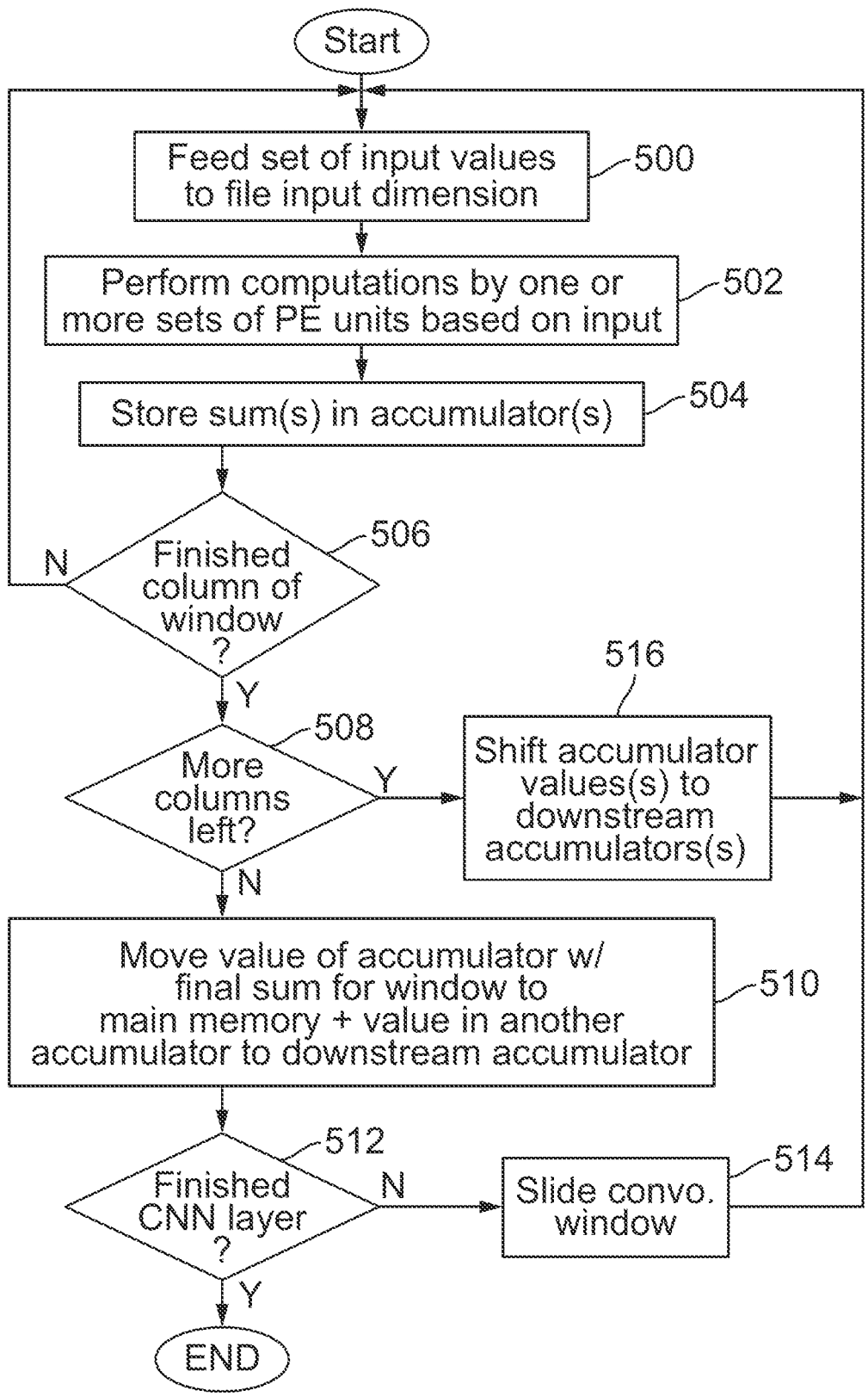
FIG. 5 is a flow diagram of a process for computing a CNN layer according to the embodiment of FIGS. 4A-4J.

FIG. 5 is a flow diagram of a process for computing a CNN layer according to the embodiment of FIG. 4. The process starts, and in block 500, a set of input values of a convolutional window 110 is input to the tile input dimension 204 during a current processing cycle. The set of input values may include an input value for one or more input channels (C) of the input feature map 110.

In block 502, one or more sets of PE units 202 receiving the set of input values perform one or more computations during the current processing cycle. A computation performed by a particular PE unit 202 may be a multiplication computation based on a particular input value in the set of input values, and a particular weight value of a column of weight values stored in the PE unit. A particular set of PE units 202 may be PE units laid out in the output dimension 206 of the tile (e.g. column of the tile).

In block 504, for each of the one or more sets of PE units 202, the results of computations by a particular set of PE units are added, and the resulting sum is stored in a corresponding accumulator 208.

In block 506, a determination is made as to whether computation of a column of the convolution window has finished. If the answer is YES, a determination is made in block 508 as to whether there are more columns of the convolution window to be computed. If the answer is NO, computation of the current convolution window is complete, and the value of the last downstream accumulator storing the final output pixel value for the window is shifted out of the accumulator in block 510, and stored in the main memory. Any value stored in a remaining other accumulator is a partial sum of an output pixel associated with another convolution window, and such value is shifted downstream to a neighboring accumulator.

In block 512, a determination is made as to whether computation of the CNN layer has finished (e.g. all output pixel values of the output feature map 106 have been computed). If the answer is YES, the process ends. If the answer is NO, the convolution window slides over by a stride value in block 514, and the process continues to block 500 to feed another set of input values for continuing computation of the CNN layer.

Referring again to block 508, if there are more columns of the convolution window to be computed, the values stored in the accumulators are only partial sums of one or more output pixels of the output feature map 106, and the partial sums are shifted downstream to a neighboring accumulator in the systolic array in block 516. The process continues to block 500 where another set of input values are fed to the tile for continuing computation of the one or more output pixels.

In one embodiment, the computation unit 100 is configured to unroll computation of a convolution layer in four dimensions (associated with four "for-loops") of convolution, such as, for example, the input channel (C), kernel height (Fy), output channel (K), and kernel width (Fx). In one embodiment, the input channel (C) and the kernel height (Fy) are unrolled/parallelized in the tile input dimension 204, and the kernel width (Fx) and output channel (K) are unrolled in the tile output dimension 206.

FIG. 6 is a block diagram of a tile 100b configured to unroll computation of a CNN layer in the input channel (C) dimension, kernel height (Fy) dimension, kernel width (Fx) dimension, and output channel (K) dimension. The values of the CNN layer of FIG. 1 is used for illustration purposes.

The tile 100b in the embodiment of FIG. 6 is similar to tile 100a in the embodiment of FIG. 4, except that instead of just unrolling the 16 input channels (C) of the input feature map 102 in the tile input dimension 204a, a column of data (e.g. column 432) in the convolutional window 110 corresponding to the kernel height (Fy), is also unrolled/parallelized in the tile input dimension. Thus, while in the embodiment of FIG. 4, the input feature data is fed sequentially one data at a time in the tile input dimension, the embodiment of FIG. 6 feeds the input feature data one column at a time.

In the embodiment of FIG. 6, the dimension of the tile 100b may be 48×24, with 48 rows of PE units 202 in the tile input dimension 204b, and 24 columns of PE units in the tile output dimension 206b. It is understood that other dimensions are also possible, and embodiments of the present disclosure are not limited to the dimension shown in FIG. 6. In unrolling a column (e.g. column 434) of input data of the convolutional window 110, for 16 input channels (C), 48 rows of the tile in the tile input dimension 204b may be used for receiving a column of input data in parallel. Taking input column 434 with input values (c, i, o) as an example, input values $(c_0, i_0, o_0)$ for the first input channel C0 are fed in parallel to rows 600-604 of the tile, along with the input values for the column for other input channels (e.g. input values $(c_{15}, i_{15}, o_{15})$ for input channel C15 which are fed in parallel to rows 606-610).

The PE units in column 400 of the tile that store the kernel weight values of column 406 of the convolutional kernel 104a, may perform parallel computations based on the received column of input values and corresponding ones of the kernel weight values, for calculating output pixel c. The PE units in column 402 of the tile that store the kernel weight values of column 408 of the convolutional kernel 104a, may perform parallel computations based on the same column of input values and corresponding ones of the kernel weight values, for calculating output pixel b. The PE units in column 404 of the tile that store the kernel weight values of column 410 of the convolutional kernel 104a, may perform parallel computations based on the same column of input values and corresponding ones of the kernel weight values, for calculating output pixel a.

A process for computing a CNN layer according to the embodiment of FIG. 6 may be similar to the process in the embodiment of FIG. 5, except that block 506 of the process may be omitted. In addition, the set of input values that are fed to the tile input dimension in block 500 is a column of input values of the convolutional window 110, for one or more input channels of the input feature map 110.

The computation unit 100 according to the various embodiments of the disclosure may be invoked by a computer module for computing one or more CNN layers of a convolutional neural network. Once the one or more CNN layers are computed, they may be used for one or more different types of classification tasks. The classification task may be, for example, an image classification task by an AI machine (e.g. an autonomous vehicle) to recognize/classify objects in an environment to move about the environment safely with little or no human input. For example, an image captured by the AI machine may be processed for computing one or more CNN layers, and outputs of the CNN layers may be used to classify one or more objects in the image (e.g. pedestrians, cars, etc.). The computed CNN layers may extract features of the input image in different levels of abstraction. The output of the CNN layers may (after some processing) be fed to a feed-forward neural network for performing the classification.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for performing computations for a deep neural network have been specifically described and illustrated herein, many modifications and variations will be apparent to those skilled in the art. Accordingly, it is to be understood that a system and method for performing computations for a deep neural network constructed according to principles of this disclosure may be embodied other than as specifically described herein. The disclosure is also defined in the following claims, and equivalents thereof.

What is claimed is:

1. A computation unit for performing a computation of a layer of a neural network, the computation unit comprising:
   plurality of processing element (PE) units arranged in an array, wherein a first set of PE units in a first column of the array is configured to perform first computations based on a first set of input values, and a second set of PE units in a second column of the array is configured to perform second computations based on a second set of input values;
   a first adder unit coupled to the first set of PE units, the first adder unit being configured to generate a first sum of results of the first computations by the first set of PE units;
   a second adder unit coupled to the second set of PE units, the second adder unit being configured to generate a second sum of results of the second computations by the second set of PE units;
   a first accumulator coupled to the first adder unit;
   a second accumulator coupled to the first accumulator and to the second adder unit,
   wherein the first accumulator is configured to store the first sum generated by the first adder unit, and further configured to shift the first sum to the second accumulator, wherein the second accumulator is configured to receive the first sum for accumulating the first sum with the second sum to generate an accumulated sum, wherein the second accumulator is further configured to shift the accumulated sum to memory for being stored as a pixel value of an output feature map, wherein a classification task is performed based on the output feature map.

2. The computation unit of claim 1, wherein the first accumulator is configured to store a partial value for a first pixel of the output feature map, and the second accumulator is configured to store a partial value of a second pixel of the output feature map.

3. The computation unit of claim 1, wherein the first computations or the second computations include multiplication computations.

4. The computation unit of claim 1, wherein the first set of input values include a first single input value associated with a first input channel of an input feature map, and a second single input value associated with a second input channel of the input feature map, and the second set of input values include a third single input value associated with the first input channel, and a fourth single input value associated with the second input channel.

5. The computation unit of claim 1, wherein the first set of input values include a first column of input values in a convolution window for a first input channel of an input feature map, and a second column of input values in the convolution window for a second input channel of the input feature map, and the second set of input values include a third column of input values associated with the convolution window for the first input channel, and a fourth column of input values associated with the convolution window for the second input channel.

6. The computation unit of claim 5, wherein the convolution window for the first or second input channel has a height corresponding to a kernel height of a convolution kernel, and a width corresponding to a kernel width of the convolution kernel.

7. The computation unit of claim 1, wherein the first set of PE units and the second set of PE units respectively store a first set of weight values and a second set of weight values associated with a particular dimension of a convolution kernel, wherein the particular dimension of the convolution kernel includes a kernel width, wherein the first set of weight values correspond to weight values stored in a first column of the convolution kernel, and the second set of weight values correspond to weight values stored in a second column of the convolution kernel.

8. The computation unit of claim 7, wherein the plurality of PE units are weight-stationary PE units, wherein the first set of weight values is stored in registers of the first set of PE units, and the second set of weight values is stored in registers of the second set of PE units.

9. The computation unit of claim 1, wherein the first set of PE units are further configured to perform third computations based on the second set of input values, wherein the first adder unit is configured to generate a third sum of results based on the third computations, wherein the first sum and the second sum are values associated with a first output pixel of the output feature map, and the third sum is a value associated with a second output pixel of the output feature map.

10. A method for performing a computation of a layer of a neural network associated with a plurality of processing element (PE) units arranged in an array, the method comprising:
   storing, by a first set of PE units in a first column of the array and a second set of PE units in a second column of the array respectively a first set of weight values and a second set of weight values associated with a particular dimension of a convolution kernel;
   receiving a first set of input values and performing, by the first set of PE units, first computations based on the first set of input values and the first set of weight values;
   receiving a second set of input values and performing, by the second set of PE units, second computations based on the second set of input values and the second set of weight values;
   generating, via a first adder unit coupled to the first set of PE units, a first sum of results of the first computations by the first set of PE units;
   storing, by a first accumulator coupled to the first adder unit, the first sum generated by the first adder unit;
   generating, via a second adder unit coupled to the second set of PE units, a second sum of results of the second computations by the second set of PE units, the second sum for being stored in a second accumulator coupled to the second adder unit and the first accumulator;
   shifting, by the first accumulator, the first sum to the second accumulator;
   receiving, by the second accumulator from the first accumulator, the first sum for accumulating the first sum with the second sum to generate an accumulated sum; and
   shifting the accumulated sum to memory for being stored as a pixel value of an output feature map, wherein a classification task is performed based on the output feature map.

11. The method of claim 10, wherein the first accumulator stores a partial value for a first pixel of the output feature map, and the second accumulator is configured to store a partial value of a second pixel of the output feature map.

12. The method of claim 10, wherein the first computations or the second computations include multiplication computations.

13. The method of claim 10, wherein the first set of input values include a first single input value associated with a first input channel of an input feature map, and a second single input value associated with a second input channel of the input feature map, and the second set of input values include a third single input value associated with the first input channel, and a fourth single input value associated with the second input channel.

14. The method of claim 10, wherein the first set of input values include a first column of input values in a convolution window for a first input channel of an input feature map, and a second column of input values in the convolution window for a second input channel of the input feature map, and the second set of input values include a third column of input values associated with the convolution window for the first input channel, and a fourth column of input values associated with the convolution window for the second input channel.

15. The method of claim 14, wherein the convolution window for the first or second input channel has a height corresponding to a kernel height of a convolution kernel, and a width corresponding to a kernel width of the convolution kernel.

16. The method of claim 10, wherein the particular dimension of the convolution kernel includes a kernel width, wherein the first set of weight values correspond to weight values stored in a first column of the convolution kernel, and the second set of weight values correspond to weight values stored in a second column of the convolution kernel.

17. The method of claim 10, wherein the plurality of PE units are weight-stationary PE units, wherein the first set of weight values is stored in registers of the first set of PE units, and the second set of weight values is stored in registers of the second set of PE units.

18. The method of claim 10 further comprising:
   performing by the first set of PE units third computations based on the second set of input values, wherein the first adder unit is configured to generate a third sum of results based on the third computations, wherein the first and second sums are values associated with a first output pixel of the output feature map, and the third sum is a value associated with a second output pixel of the output feature map.

* * * * *